United States Patent [19]

Fitzwater, deceased et al.

[11] E Re. 30,135

[45] Reissued Nov. 6, 1979

[54] ELECTRIC FAIL-SAFE ACTUATOR

[75] Inventors: John H. Fitzwater, deceased, late of Warwick, R.I., by Amelia Fitzwater, executrix, 116 Imperial Dr., Warwick, R.I. 02886

[73] Assignee: Amelia Inc., Warwick, R.I.

[21] Appl. No.: 626,723

[22] Filed: Oct. 29, 1975

Related U.S. Patent Documents

Reissue of:

[64] Patent No.: 3,808,895
Issued: May 7, 1974
Appl. No.: 331,191
Filed: Feb. 9, 1973

[51] Int. Cl.[2] ..... F16H 5/40; G01G 17/00

[52] U.S. Cl. ..... 74/2; 74/625; 251/66; 251/68; 251/69; 251/70; 251/71

[58] Field of Search ..... 74/2, 625; 251/66, 68, 251/69, 70, 71

[56] References Cited

U.S. PATENT DOCUMENTS

| | | | |
|---|---|---|---|
| 3,279,744 | 10/1966 | Fieldson et al. | 251/71 |
| 3,466,005 | 9/1969 | Kleeberg | 251/71 |
| 3,572,163 | 3/1971 | Clark | 74/625 |
| 3,606,980 | 9/1971 | Simpson et al. | 251/66 |

FOREIGN PATENT DOCUMENTS

| | | | |
|---|---|---|---|
| 6922573 | 6/1969 | Fed. Rep. of Germany | 74/2 |

*Primary Examiner*—Samuel Scott
*Assistant Examiner*—R. C. Turner
*Attorney, Agent, or Firm*—Hill, Van Santen, Steadman, Chiara & Simpson

[57] ABSTRACT

An electrically operated fail-safe valve actuator employs a spring which is wound to store energy during operation of the electric drive motor, an electric clutch operable to disengage the drive motor from the actuator output shaft in response to loss of power from the electrical supply whereby the spring drives the valve in the opposite direction.

19 Claims, 7 Drawing Figures

Fig. 2
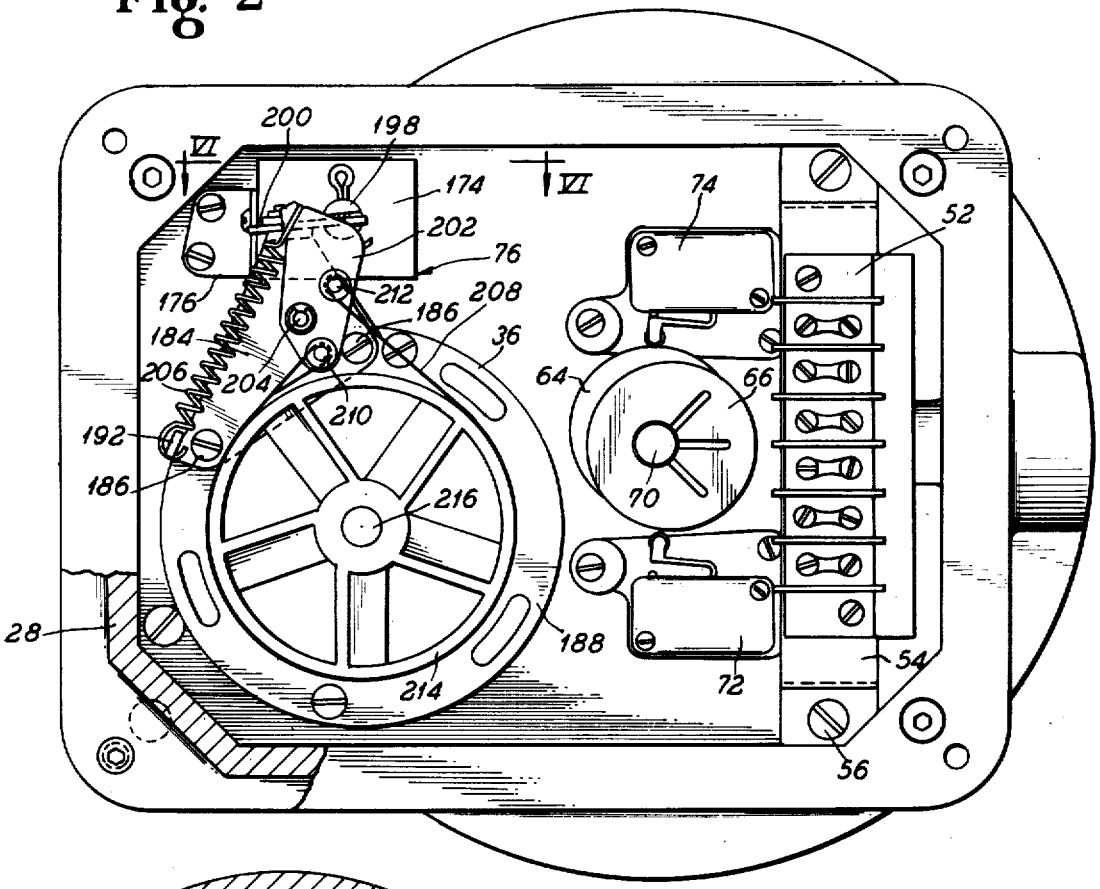
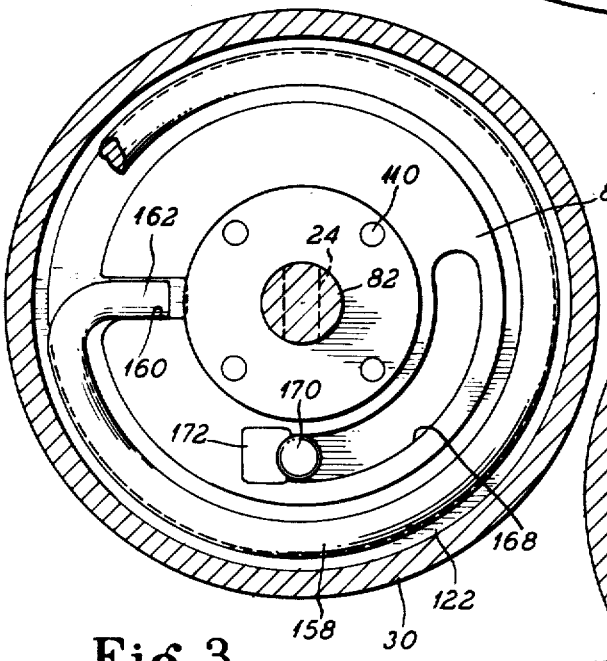
Fig. 3
Fig. 4
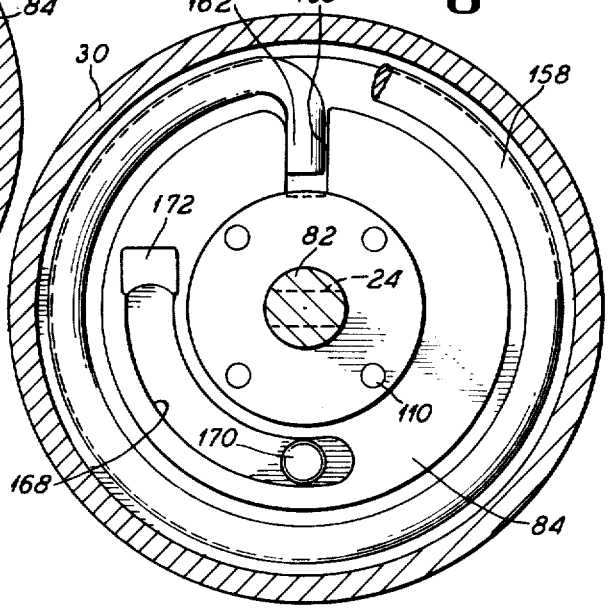

ELECTRIC FAIL-SAFE ACTUATOR

Matter enclosed in heavy brackets [ ] appears in the original patent but forms no part of this reissue specification; matter printed in italics indicates the additions made by reissue.

BACKGROUND OF THE INVENTION

Field of the Invention

This invention relates to electrically operated valve actuators, and more particularly to a fail-safe valve actuator.

Description of the Prior Art

In the petroleum and related industries, valve actuators are employed for controlling the flow of liquid from one location to another, for example in fuel feed lines of electrical power generation stations and in the transportation of both refined and crude petroleum products. In such installations, it is sometimes necessary to terminate flow in certain emergencies, such as the loss of electrical power, in order to prevent loss of fuel and/or the undesirable effects of contamination or pollution.

One type of actuator which has found advantageous use in the aforementioned application is disclosed by Malcolm D. Clark in his U.S. Pat. 3,572,163, granted Mar. 23, 1971 and assigned to Raymond Control Systems, Inc. Although this valve actuator has proven advantageous in many applications, it primarily depends upon the availability and integrity of electrical power supply for operation. In recognizing that outages occur, and that it may be necessary to operate a valve during a power failure, Clark provided his actuators with means for electrically disconnecting the electric motor and mechanically disengaging the motor from the output shaft connected to the valve, and means for manually operating the actuator. Although service personnel are alerted of the necessity for manual operation of the valve by means of monitoring devices, loss of fuel and/or pollution could occur between the time a service man is alerted to operate the valve and the time that the valve is actually manually operated.

SUMMARY OF THE INVENTION

It is therefore the primary object of the present invention to provide an electrically operated fail-safe valve actuator which is responsive to a loss of power, due to switching or power failure, to automatically drive the valve to a predetermined valve setting, for example to a completely closed condition.

Another object of the invention is to provide an automatic fail-safe valve actuator which does not rely on an external source of energy for fail-safe operation.

Another object of the invention is to provide an electrically operated fail-safe valve actuator which drives a valve in one direction toward a predetermined valve setting and which automatically responds, in a fail-safe manner, to a loss of electrical power to drive the valve in the opposite direction toward a predetermined setting at any time during driving of the valve in the first mentioned direction.

An electric fail-safe valve actuator, according to the invention, includes an actuator output shaft which extends from an actuator housing and is connected with the stem of a valve to be operated. The actuator output shaft is coupled to an output shaft of a prime mover system by means of an electrically operated spring type clutch mechanism. The prime mover system and the clutch mechanism are enclosed within a housing with the prime mover system generally located in one compartment of the housing and the clutch mechanism generally located in another compartment of the housing. A coil spring is connected to the actuator output shaft and to the housing and is disposed about the output shaft and the clutch mechanism. As the prime mover system drives the valve in one direction, say toward the full open setting, the coil spring is wound to store energy. Upon the removal of power from the clutch mechanism, which is electrically connected in shunt across the prime mover system, the spring releases its energy to drive the valve in the opposite direction, for example toward a completely closed setting. Of course, in certain applications one may wish to electrically drive the valve toward a fully opened condition and employ fail-safe operation for completely closing the valve, while in other applications just the opposite operation may be desired.

BRIEF DESCRIPTION OF THE DRAWINGS

Other objects, features and advantages of the invention, its organization, construction and operation will be best understood from the following detailed description taken in conjunction with the accompanying drawings, on which:

FIG. 2 is a sectional view of the apparatus illustrated in FIG. 1 taken generally along the parting line II—II;

FIG. 3 is a sectional view of the apparatus illustrated in FIG. 1, taken generally along the parting line III—III;

FIG. 4 is a sectional view taken along the same parting line III—III in FIG. 1 as was FIG. 3, but showing the position of certain portions of the apparatus because of pre-winding of the spring motor;

DESCRIPTION OF THE PREFERRED EMBODIMENTS

Figure 1:
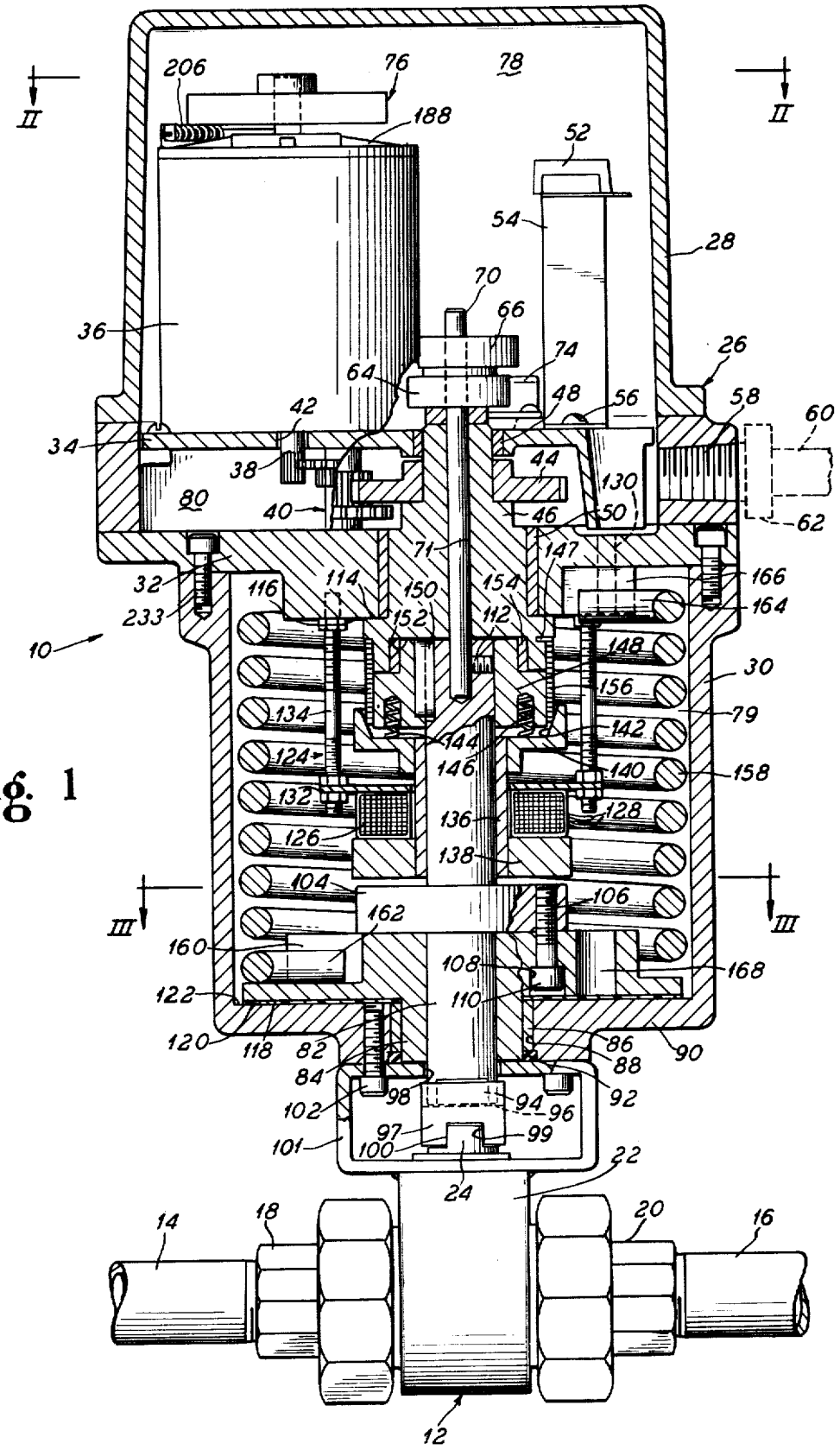
FIG. 1 is a sectional elevational view of an electrically operated fail-safe valve actuator, shown connected to a valve.

Referring to FIG. 1, an electrically operated actuator is generally illustrated at 10 as connected to a valve 12. The valve 12 is interposed in a conduit, such as a fuel feed line having respective threaded pipes 14, 16. A coupling nut 18 connects the threaded pipe 14 to the valve 12, while a similar coupling nut 20 connects the threaded pipe 16 to the valve 12. The valve 12 includes a housing 22 having the working valving components therein, such as a valve seat, etc, and a rotatable valve stem 24. Typical of such valves is the 1" ball valve.

The actuator 10 includes an actuator housing 26 which comprises a housing shell 28 and a housing shell 30. A center wall 32 generally divides the housing into two compartments, 78 and 79. The compartment 78 may be considered as the motor compartment, or the electric motor compartment, and the compartment 79 may be considered as the clutch compartment and/or the spring motor compartment.

The compartment 78 includes a mounting plate 34 on which is mounted an electric motor 36 having an output shaft 38 which extends through an aperture 42 in the mounting plate 34. The output shaft 38 has a pinion which is connected by way of a gear train 40 to a gear 44 securely mounted on a shaft 46. The shaft 46 may therefore also be considered as the motor output shaft, or as the output shaft for the electric motor prime mover system.

The shaft 46 is rotatably mounted in the mounting plate 34 by means of a bearing 48, and rotatably mounted in the center wall 32 by means of a bearing 50.

The mounting plate 32 also carries a terminal block 52 which is mounted on the mounting plate 34 by means of a terminal block mount 54 and machine screws 56.

The actuator further includes a threaded bore 58 for receiving therethrough an electrical cable 60 which is fastened to the housing by means of a cable connector 62, the cable 60 and the connector 62 being illustrated in phantom.

The shaft 46 includes a bore 71 which rotatably receives therein a shaft 70, which functions as a cam shaft. The cam shaft 70 carries a plurality of cams, two cams 64, 66 being illustrated in this particular exemplary embodiment. The cams 64, 66 are operatively associated with a pair of switches 72, 74 (FIG. 2) which function as limit switches and signaling switches, which will be discussed in greater detail below.

The electric motor 36 is provided with a brake 76, which will also be discussed in greater detail later on. It should be noted that the center wall 32 and the mounting plate 34 effectively define a compartment or subcompartment for housing the gear train 40. Inasmuch as the apparatus just described is essentially the same as that disclosed in the aforementioned Clark patent, with the exception of manual operation, the same will not be treated in further detail herein, but is fully incorporated herein by reference.

The actuator output shaft 82 is secured to a spring mount 84 for mutual rotation. For this purpose, the actuator output shaft 82 includes a circular flange 104 having a plurality of threaded bores therein which are aligned with counterbores 108 in the spring mount 84. The aligned bores receive machine screws 110 for affixing these elements together. The spring mount 84 is rotatably connected through a bottom wall 90 of the shell 30 by means of a bearing 86 positioned within a bore 88.

The bearing 86 is sealed by means of a seal 92. It should be noted that the apparatus illustrated in FIG. 1 may be rendered suitable for protection against the elements and for explosion proof operation by the provision of the suitable seals between the housing shells 28, 30.

The outwardly extending end 94 of the shaft 82 is received in a slot 96 of a coupling 97 which has a slot 99 orthogonal thereto for receiving flats 100 of the valve stem 24 for aligning the actuator and the valve. In order to mount the actuator 10 to the valve 12, a mounting bracket 101 is provided and a plurality of screws 102 secure the actuator and valve.

The spring mount 84 includes a flat surface 118 which bears upon a thrust pad 120 and a self-lubricating type such as Teflon, which in turn rests upon the inner surface of the end wall 90. The shaft 46 includes a shoulder 114 which bears against the end of the bearing 50 and a surface 116 of the center wall 32. With the upper end of the shaft 82 adjacent the lower end of the shaft 46, as shown in FIG. 1, there is therefore little axial movement of these shafts.

In order to couple the shafts 46, 82 together for mutual rotation to electrically drive the valve toward, for example, the full open setting, an electric clutch 124 is provided. The clutch 124 comprises an electromagnetic coil 126 having a pair of leads 128 for connection to an electrical supply. The leads 128 have been cut short and, although not shown in FIG. 1, normal extent upwardly through a bore 130 in the center wall 32 for connection to the terminal block 52. The electromagnetic coil 126 is carried on a mounting plate 132 which, in turn, is rigidly suspended from the center wall 32 by a plurality of mounting studs 134. The clutch 124 is further provided with an armature including an armature bearing 136 which receives the shaft 82 therein for relative rotary and axial movement, an armature member 138 secured to one end of and carried by the armature bearing 136, and an armature member 140 secured to and carried by the other end of the armature bearing 36. The armature member 140 includes a surface which is disposed at an angle to the shaft 82, both radially and axially; the purpose of this surface becoming evident below. The armature member 140 is biased away from a member 148 by means of a plurality of bias springs 144 disposed in respective bores 146. The member 148 is keyed to the shaft 82 by means of a key 150 and therefore rotates with the shaft 82. The upper end of the member 148 extends into a cup-shaped end of the shaft 46 defined by a surface 152 and a bearing 154.

A flat spring 156 is carried about the lower outer surface of the shaft 46 and clearing the member 148 one end fixed to the shaft 46 at 147.

With the electromagnetic coil 126 energized, the armature member 138 is attracted toward the coil and moves the entire armature assembly upwardly, as illustrated in the drawing, to force the surface 142 against the spring 156 and causes the spring to grip the member 148. This action effects a coupling between the shaft 82 and the shaft 46. Energization of the motor 36 therefore causes rotation of the valve stem 24 by way of the gear train 40, the shaft 46 and the shaft 82.

As the valve is driven by the electric motor 36, energy is stored in a spring 158. The spring 158 is a coil spring disposed within the chamber 79 generally defined by the housing shell 30. The coil spring has one end 162 located in a groove 160 in the spring mount 84 and the other end 164 located in a similar groove 166 in the center wall 32. It is readily apparent that the energy stored in the spring is released upon deenergization of the electromagnetic coil 126 so that the spring 158 acts as a motor to drive the valve 12 in the opposite direction.

Figure 5:
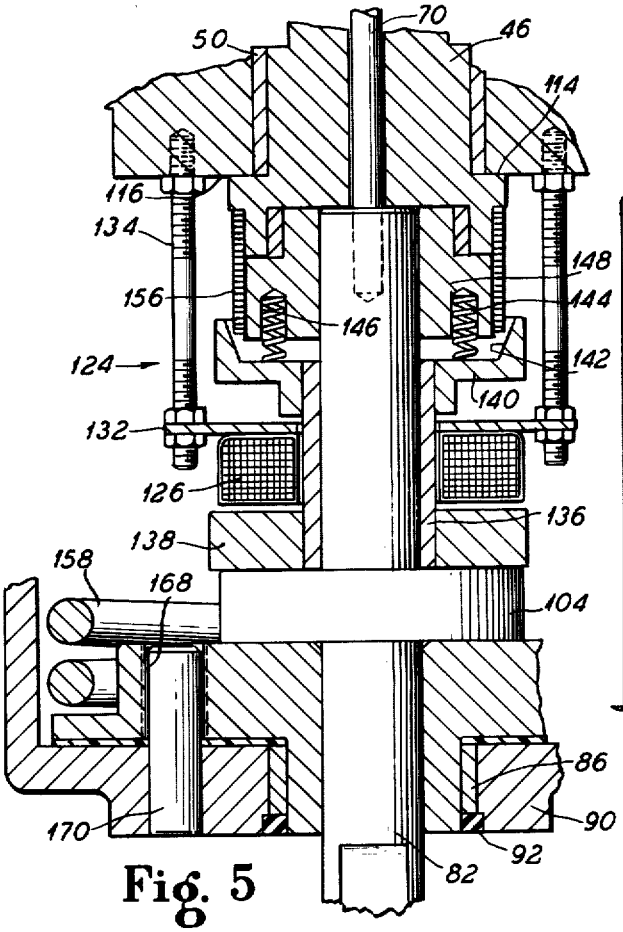
FIG. 5 is a fragmentary sectional view of a portion of the apparatus illustrated in FIG. 1, showing the positions of the respective elements with the clutch mechanism disengaged.

FIG. 1 illustrates the actuator with the clutch 124 operated to engage the shafts 46 and 82. FIG. 5, on the other hand, illustrates the clutch 124 in a deenergized condition whereby the shafts 46 and 82 are disengaged.

Referring for a moment to FIGS. 3 and 4, sectional views of a portion of the actuator of FIG. 1 are illustrated. Inasmuch as it is necessary to have sufficient energy stored in the spring 158 so that the spring motor action can drive the valve to an extreme position opposite to that driven toward by the electric motor 36, the spring 158 is free-wound during assembly. In a particular actuator constructed as shown in the instant drawings, and with the clutch disengaged, a relative rotation of the shaft 82 and the center wall 32 is provided to wind the spring. In a particular actuator a winding of 166° provided 600 lb.in. As shown in FIGS. 3 and 4, the spring mount 84 includes an arcuate slot 168 for receiving a pin 170 which extends from the end wall 90 of the housing shell 30. With the relative rotation of parts, the pin 170 links the elements for winding to store sufficient energy in the spring 158 (300 lb. in provided at 83° in the above example), after which the housing shell 30 is secured to the center wall 32, such as by means of machine screws 233. The amount of pre-winding, of course, depends on the particular valve application. One end of the arcuate slot 168 has mounted therein a resilient stop 172 so that the pin 170 is provided with a yieldable striking action upon driving of the valve by means of the spring motor.

Figure 6:
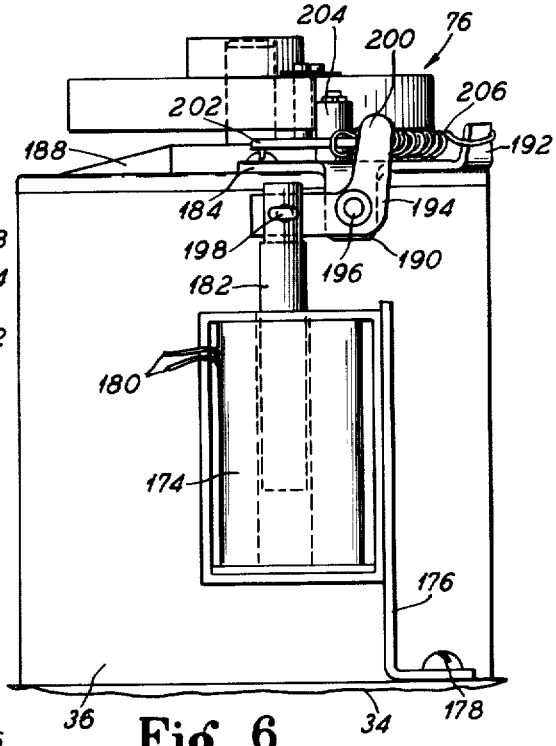
FIG. 6 is a sectional view of a portion of the apparatus illustrated in FIG. 2 and generally taken along the parting line VI—VI.

As the valve is driven toward a full open setting, for example, or to a particular intermediate setting, it is desirable to maintain the valve in the desired setting over extended period of time. Therefore, a brake 76 (FIGS. 1, 2 and 6) is provided to hold the valve in the desired position upon deenergization of the electric motor 36. Referring to FIGS. 2 and 6 in particular, the brake 76 comprises a solenoid 174 carried by a mounting bracket 176 which is, in turn, fixed to the mounting plate 34 by means of screws 178. The solenoid 174 includes a pair of electrical leads 180 for extension and connection to the terminal block 52. The brake 76 further includes an extensible member 182 which moves into and out of the solenoid 174 upon energization and deenergization of the solenoid. A pivot plate 184 is secured to the motor and bell 188 by means of machine screws 186. The pivot plate 184 includes a downturned arm 190 and an upturned arm 192. A pivot arm 194 is pivotally connected to the arm 190 by a pivot pin 196 and is pivotally connected to the extensible member 182 at 198, for example by means of a cotter pin. In FIG. 6 it is readily apparent that a downward movement of the extensible member 182 causes counterclockwise rotation of the pivot arm 194 about the pivot pin 196. Such movement places the distal end 200 of the pivot arm 194 against a pivot plate 202 which is pivotally connected to the pivot plate 184 by means of a pivot pin 204 to move the pivot plate clockwise as viewed in FIG. 2 against a bias provided by a spring 206 which is connected between the pivot plate 202 and the arm 192 of the pivot plate 184. A brake band 208 is connected at its opposite ends to brake band pins 210, 212, respectively, which are carried by the pivot plate 202. The brake band 208 surrounds a brake drum 214 and is normally biased by the spring 206 to tighten about the brake [band] *drum* 214; the brake [band] *drum* 214 being carried by an end 216 of the electric motor shaft. Clockwise movement of the pivot plate 202, however, releases the brake so that the electric motor 36 is able to drive the valve 12. Therefore, energization of the motor 36 and energization of the solenoid 174 occur at the same time. Deenergization of the motor at the desired valve setting is accompanied by a complementary deenergization of the solenoid 174 to brake the motor and hold the valve in the desired position.

Figure 7:
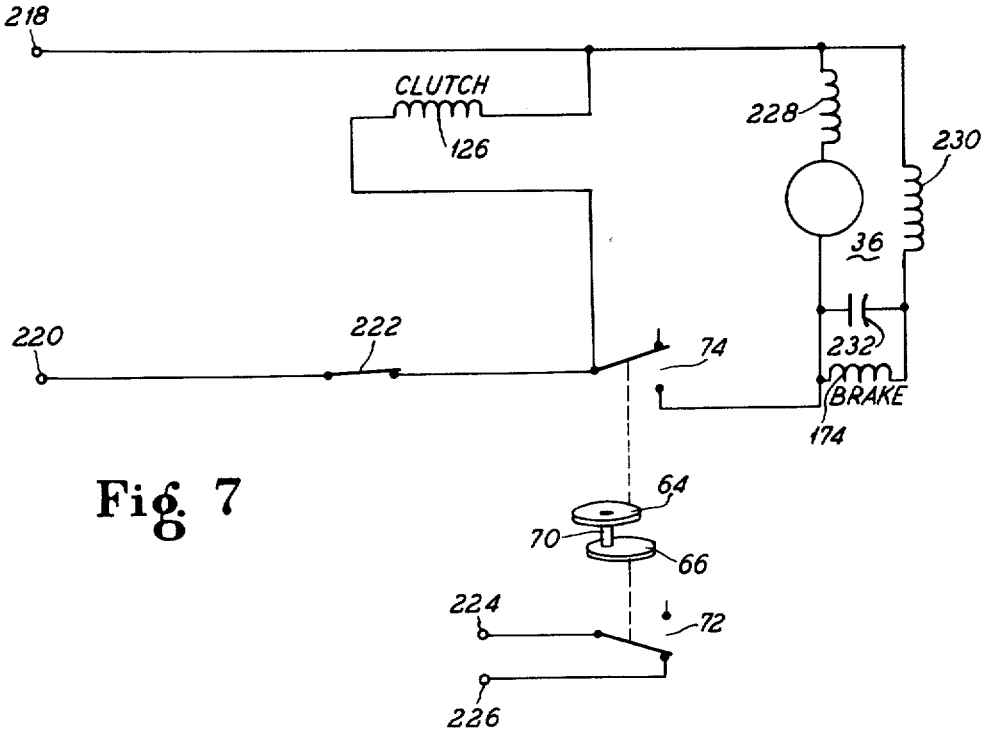
FIG. 7 is a schematic circuit diagram of a valve actuator constructed in accordance with the principles of the present invention.

It is believed that the invention will fall into complete perspective through the following detailed description relating to FIG. 7 which schematically illustrates the circuit of the actuator 10. The circuit comprises a pair of input terminals 218, 220 for receiving power from a commercial alternating current supply, such as 120 V, 60 Hz. The terminal 218 is connected to a pair of motor windings 228 and 230 and to one terminal of the clutch electromagnetic coil 126. The terminal 220 is connected to the other terminal of the clutch electromagnetic winding 126 by way of a switch 222 which may be an on/off control switch mounted at a remote console. The switch 222 is connected to a movable contact of a cam operated switch 74 (see FIG. 2) and connectible thereby to one terminal of the solenoid 174 and a motor capacitor 232. Upon closure of the switch 222 the clutch 126 is energized to cause engagement between the shafts 46 and 82, as discussed above. With the switch 74 closed, in response to the position of the cam 64 carried by the shaft 70 which rotates with the shaft 82, the motor windings 228, 230 and the brake solenoid 174 are energized to drive the valve toward a predetermined setting, such as full opened. As the valve reaches the desired position, the cam 64 opens the contacts 74 to stop the motor 36, deenergize the brake solenoid 174 to set the brake and simultaneously brake the motor and maintain the valve in the desired condition. It should be noted that the electromagnetic winding 126 remains energized at all times, unless the switch 222 is open, or unless there is a loss of power due to a power failure or the like. In this example on/off corresponds to open/close.

During the just-mentioned driving operation, energy is stored in the spring 158 so that upon an opening of the switch 222 or a loss of power at the terminals 218, 220, the spring motor will drive the valve in the opposite direction, e.g. to the fully closed setting.

Operation of the valve is provided by means of a switch 72 which is operated by a cam 66 also carried by the shaft 70. The switch 72 is connected to a pair of output leads 224, 226 which may be extended to a power supply and signal lamp to indicate valve position. It is readily apparent that a number of such switches and associated operative cams may be provided to indicate valve positions intermediate fully closed and fully opened so that service personnel can monitor the intermediate positions of the valve. By the same token, a plurality of switches 222 could be connected to the clutch and motor along with a plurality of switches, such as switch 74, to selectively drive the valve to intermediate valve positions. Of course, leakage paths would be obviated by the use of mechanical lockout switches or the like in connection with the electromagnetic coil 126.

In summary, therefore, an automatic fail-safe electrically operated valve actuator has been described which responds to a loss of electrical energy to the actuator to drive the valve to a predetermined valve setting, for example to a completely closed condition. Also, the actuator described has shown to be completely fail-safe in that automatic return of the valve to the predetermined setting will occur whether the valve has been locked at a certain desired setting, or is in the process of being driven toward a desired setting.

In a particular construction of the valve actuator all of the bearings were brass. Also it was discovered that clutch operation was enhanced when non-magnetic stainless steel was used for the shaft 82, carbon steel was used for the armature member 138 and element 136 was a non-ferrous material such as brass or aluminum.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

[1. An electrically operated valve actuator, comprising:

an electric motor for connection to an electrical supply;

means for connecting said motor to a valve for driving the valve in one direction, including electric clutch means for connection to the electrical supply and normally energized to connect said motor in driving engagement with the valve and deenergized in response to loss of power from the electrical supply to disengage the valve from said motor; and energy storage means for connection to the valve responsive to the operation of said motor to store energy and responsive to disengagement of said motor from the valve to drive the valve in the opposite direction.]

[2. An electrically operated valve actuator according to claim 1, comprising:

switch means operated in response to a predetermined number of revolutions of said motor to disconnect said motor from the electrical supply; and brake means operated in response to said switch means to hold the valve in the position driven by said motor.]

[3. An electrically operated valve actuator according to claim 2, wherein said brake means includes an electromagnetic device for connection to the electrical supply and normally energized with said motor to a non-braking condition.]

[4. In a valve actuator of the type having an electric motor for connection to and driving a valve toward a first predetermined condition and a limit switch for opening the powering circuit of the motor when the valve has reached the first predetermined condition, the improvement comprising:

coupling means for connection to the power supply for the motor and interposed between the motor and the valve, said coupling means including means normally engaged between the valve and the motor and responsive to a loss of power from the power supply to disengage the motor and the valve; and energy storage means for connection to the valve and engaged with the motor by said means which normally causes engagement between the motor and the valve, said energy storage means storing energy upon driving of the valve toward the first predetermined condition and responsive to disengagement to drive the valve toward a second predetermined condition.]

[5. An electrically operated valve actuator, comprising:

electric motor means for connection to an electrical supply to drive a valve, said motor means including an electric motor, an output shaft and switch means including contacts connected between said motor and the electrical supply, said switch means coupled to said output shaft and operated upon a predetermined number of revolutions thereof to disconnect said motor from the electrical supply;

electric brake means for connection to the valve and electrically connected to said switch means, said brake means operated in response to the operation of said switch means to hold the valve in the position driven by said motor;

energy storage means for connection to the valve and operated to store energy upon operation of the valve in one direction; and electric clutch means connected between said motor and the valve and electrically connected to the electrical supply, said clutch means operable to disengage said motor from the valve in response to loss of power from the electrical supply whereupon said energy storage means becomes effective to drive the valve in the opposite direction.]

[6. An electrically operated valve actuator according to claim 5, comprising:

an actuator output shaft for connection to the valve, said actuator output shaft axially aligned with said motor output shaft;

said electric clutch means including a clutch winding for connection to the electrical supply, a clutch armature mounted for axial movement with respect to said motor output shaft and said output shaft upon energization and deenergization of said clutch winding, and spring means carried by one of said shafts and disposed about both of said shafts, said spring means urged by said clutch armature to frictionally embrace the other of said shafts for driving engagement with said one shaft upon energization of said clutch winding.]

[7. An electrically operated valve actuator according to claim 6, wherein said clutch armature includes a central bore which receives said actuator output shaft therethrough and a surface disposed at an angle to the axis of said actuator output shaft to engage and urge said spring means axially and radially inwardly against said actuator output shaft.]

[8. An electrically operated valve actuator according to claim 6, wherein said clutch winding includes a central bore receiving said actuator output shaft therethrough, and said surface of said clutch armature is disposed between said clutch winding and said spring means.]

[9. An electrically operated valve actuator according to claim 8, wherein said clutch armature includes a bearing carried on and slidable axially along said actuator output shaft, a first armature portion mounted at one end of said bearing and a second armature portion mounted at the other end of said bearing and carrying said surface for engagement with said spring means.]

[10. An electrically operated valve actuator, comprising:

an actuator housing including first and second end walls, sidewalls and compartment wall dividing said housing into a motor compartment and a clutch compartment;

electric motor means mounted in said motor compartment for connection to an electrical supply to drive a valve, said motor means including an electric motor, a motor output shaft and switch means including contacts interposed between said motor and the electrical supply, said switch means coupled to said motor output shaft and operated upon a predetermined number of revolutions thereof to disconnect said motor from the electrical supply;

an actuator output shaft extending through said clutch compartment for connection to a valve to be actuated;

energy storage means mounted in said clutch department and connected between said actuator housing and said actuator output shaft, said energy storage means operated to store energy upon operation of the valve in one direction; and electric clutch means mounted in said clutch compartment for connecting said motor output shaft to said actuator output shaft, said electric clutch means electrically connected to the electrical supply and operable to disengage said motor output shaft and said actuator output shaft in response to loss of power from the electrical supply whereupon said energy storage means drives the valve in the opposite direction.]

[11. An electrically operated valve actuator according to claim 10, wherein said actuator output shaft and said motor output shaft are mounted for rotation and have the same axis of rotation, and wherein said electric clutch means includes a clutch winding for connection to the electrical supply, a clutch armature mounted for movement along the axis of rotation of said shafts, and spring means carried about said motor output shaft and said actuator output shaft for causing engagement and disengagement between said shafts in response to movement of said clutch armature.]

[12. An electrically operated valve actuator according to claim 11, wherein said clutch armature includes a bore for receiving said actuator output shaft therethrough, and having at least one surface disposed at an angle to the axis of said shafts to engage and urge said spring means axially and radially inwardly with respect to said shafts.]

[13. An electrically operated valve actuator according to claim 11, wherein said clutch winding is fixed to one of said walls within said clutch compartment and includes a bore for receiving said actuator output shaft therethrough, and wherein at least a portion of said clutch armature is disposed between said clutch winding and said spring means.]

[14. In an electric valve actuator of the type wherein electric motor means is connectible to an electrical supply and mechanically connectible to a valve by way of the motor output shaft, the improvement therein of fail-safe means comprising:

spring motor means interposed between the electric motor means and the valve and operated to store energy upon driving of the valve by the electric motor means; and electric clutch means connectible with the electric motor means to the electrical supply and energizible with the electric motor means to engage the electric motor means and said spring motor means and deenergizible upon a loss of power from the electrical supply to disengage the electric motor means and said spring motor means, whereupon said spring motor means is operable to drive the valve in the direction opposite to that driven by the electric motor means.]

[15. The improvement set forth in claim 14, wherein said spring motor means comprises:

a rotatably mounted actuator output shaft for connection to the valve; and a spring having a fixed end and an end connected to said rotatable actuator output shaft.]

[16. The improvement set forth in claim 15, wherein said electric clutch means comprises:

an electromagnetic coil;

a clutch armature attracted upon energization of said coil and mounted on said actuator output shaft for relative rotary and fixed axial movement with respect to said shaft; and a clutch spring disposed about the output shaft of the electric motor means and said actuator output shaft and urged by said clutch armature to engage the two shafts for mutual rotation in response to energization of said electromagnetic coil.]

[17. An electric fail-safe valve actuator for connection to a valve, comprising:

an electric motor for driving the valve in one direction;

a spring motor, wound by said electric motor, for driving the valve in the opposite direction; and an electric clutch energized with said electric motor for engaging said electric and spring motors and deenergized with said electric motor for disengaging said motors and permitting said spring motor to drive the valve.]

[18. An electric fail-safe actuator according to claim 17, comprising:

a housing including an intermediate wall dividing said housing into two compartments, said electric motor mounted in one of said compartments, and spring motor and said electric clutch mounted in the other compartment.]

[19. An electric fail-safe valve actuator according to claim 18, wherein said spring motor comprises:

a rotatably mounted output shaft for connection to the valve; and a spring mounted about said spring motor output shaft, said spring having a first end fixed to said housing and a second end fixed to said output shaft.]

[20. An electric fail-safe valve actuator according to claim 18, wherein said electric motor comprises:

a rotatably mounted output shaft; said spring motor comprises:

a rotatably mounted output shaft; and a spring disposed about said spring motor output shaft including a first end fixed to said housing and a second end fixed to said spring motor output shaft; and said electric clutch comprises:

an electromagnetic coil; and means responsive to the energization of said coil to engage said two output shafts.]

[21. An electric fail-safe actuator according to claim 20 wherein said electric motor output shaft and said spring motor output shaft are axially aligned;

wherein said means responsive to the energization of said coil comprises an armature carried about said spring motor output shaft for axial movement therealong; and a clutch spring carried by said electric motor output shaft and disposed about both of said motor shafts, said clutch spring being urged by said armature to couple said shafts for mutual rotation upon energizaton of said coil.]

[22. An electric fail-safe valve actuator according to claim 21, wherein said electric motor output shaft comprises:

an axial bore extending through said shaft; said spring motor output shaft comprises:

an axial bore extending at least partially into said shaft; and wherein said actuator further comprises:

a cam shaft fixed in said bore of said spring motor output shaft and rotatably received through said electric motor output shaft, said cam shaft extending from said other compartment into said one compartment;

at least one cam mounted on said cam shaft; and a limit switch disposed in said one compartment for operation by said cam when said valve is at a predetermined setting, said limit switch electrically connected between said electric motor and the electrical supply.]

[23. An electric fail-safe valve actuator according to claim 17, comprising:

a brake mounted on said electric motor including a brake solenoid electrically connected to said motor for simultaneous energization therewith, said brake operated to a non-braking condition upon energization.]

[24. An electric fail-safe valve actuator according to claim 23, wherein said brake comprises:

a brake drum mounted on said electric motor shaft;

a brake band about said brake drum biased to a braking condition; and a mechanical linkage connected between said solenoid and said brake band.]

[25. An electric fail-safe valve actuator according to claim 24, wherein said solenoid is mounted on the side of said electric motor and includes an extensible member connected to said linkage.]

[26. An electric fail-safe valve actuator according to claim 25, wherein said mechanical linkage comprises:

a first plate fixed to one end of said electric motor adjacent said brake drum;

a second plate pivotally carried on said first plate, said second plate including means connected to the ends of said brake band;

a third plate pivotally carried on said first plate and pivotally connected to said extensible member and pivotal to pivot said second plate; and a bias spring connected between said first and second plates to bias said second plate to tighten said band about said drum.]

[27. An electric fail-safe valve actuator according to claim 26, wherein said first plate includes an arm extending at a right angle to the plate generally parallel to the side of said electric motor and pivotally mounting said third plate.]

[28. An electric fail-safe valve actuator according to claim 27, wherein said first plate includes a second arm extending therefrom and mounting one end of said bias spring.]

[29. An electric fail-safe valve actuator for connection to a valve, comprising:

an electric motor for driving the valve in one direction;

spring motor, wound by said electric motor, for driving the valve in the opposite direction; and an electric clutch energized with said electric motor for engaging said electric and spring motors and deenergized with said electric motor for disengaging said motors and permitting said spring motor to drive the valve, said spring motor including a prewound spring having energy stored therein before being wound by said electric motor.]

[30. An electrically operated actuator for operating a device from one position to another, comprising:

an electric motor for connection to an electrical supply;

means for connecting said motor to the device for driving the device in one direction, including electric clutch means for connection to the electrical supply and normally energized to connect said motor in driving engagement with the device and deenergized in response to loss of power from the electrical supply to disengage the device from said motor; and energy storage means for connection to the device responsive to the operation of said motor to store energy and responsive to disengagement of said motor from the device to drive the device in the opposite direction.]

[31. In an actuator of the type having an electric motor for connection to and driving a device toward a first predetermined position and a limit switch for opening the powering circuit of the motor when the device has reached the first predetermined position the improvement comprising:

coupling means for connection to the power supply for the motor and interposed between the motor and the device said coupling means including means normally engaged between the device and the motor and responsive to a loss of power from the power supply to disengage the motor and the device; and energy storage means for connection to the device and engaged with the motor by said means which normally causes engagement between the motor and the device, said energy storage means storing energy upon driving of the device toward the first predetermined condition and responsive to disengagement to drive the device toward a second predetermined position.]

*32. An electrically operated valve actuator, comprising:*

*an electric motor for connection to an electrical supply;*

*means for connecting said motor to a valve for driving the valve in one direction, including electric clutch means for connection to the electrical supply and normally energized to connect said motor in driving engagement with the valve and deenergized in response to loss of power from the electrical supply to disengage the valve from said motor;*

*energy storage means for connection to the valve responsive to the operation of said motor to store energy and responsive to disengagement of said motor from the valve to drive the valve in the opposite direction;*

*switch means operated in response to a predetermined number of revolutions of said motor to disconnect said motor from the electrical supply; and*

*brake means operated in response to the operation of said switch means to hold the valve in the position driven by said motor,*

*said electric clutch means including a pair of axially aligned shaft means, an electromagnetic coil disposed about one of said shaft means, a clutch armature disposed about said one shaft means and axially movable toward the other shaft means, a torsion spring disposed about said other shaft means and having one end connected to said other shaft means and the other end disposed adjacent said armature, and means on said armature for gripping the other end of said torsion spring to cause a tightening of said torsion spring about said pair of shaft means to couple said shaft means together when said electric motor is energized to drive the valve.*

*33. An electrically operated valve actuator according to claim 32, wherein said brake means includes an electro-*

*magnetic device for connection to the electrical supply and normally energized with said motor to a non-braking condition.*

*34. An electrically operated valve actuator, comprising:*

*electric motor means for connection to an electrical supply to drive a valve, said motor means including an electric motor, an output shaft and switch means including contacts connected between said motor and the electrical supply, said switch means including a switch operating shaft coupled to said output shaft and operated upon a predetermined number of revolutions thereof to disconnect said motor from the electrical supply;*

*electric brake means for connection to the valve and electrically connected to said switch means, said brake means operated in response to the operation of said switch means to hold the valve in the position driven by said motor;*

*energy storage means for connection to the valve and operated to store energy upon the operation of the valve in one direction; and*

*electric clutch means connected between said motor and the valve and electrically connected to the electrical supply, said clutch means operable to disengage said motor from the valve in response to loss of power from the electrical supply whereupon said energy storage means becomes effective to drive the valve in the opposite direction.*

*35. An electrically operated valve actuator, comprising:*

*electric motor means for connection to an electrical supply to drive a valve, said motor means including an electric motor, an output shaft and switch means including contacts connected between said motor and the electrical supply, said switch means coupled to said output shaft and operated upon a predetermined number of revolutions thereof to disconnect said motor from the electrical supply;*

*electric brake means for connection to said motor and electrically connected to said switch means, said brake means operated in response to the operation of said switch means to hold the valve, via said motor, in the position driven by said motor;*

*energy storage means for connection to the valve and operated to store energy upon operation of the valve in one direction;*

*electric clutch means connected between said motor and the valve and electrically connected to the electrical supply, said clutch means operable to disengage said motor from the valve in response to loss of power from the electrical supply whereupon said energy storage means becomes effective to drive the valve in the opposite direction; and*

*an actuator output shaft for connection to the valve, said actuator output shaft axially aligned with said motor output shaft,*

*said electric clutch means including a clutch winding for connection to the electrical supply, a clutch armature mounted for axial movement with respect to said motor output shaft and said actuator output shaft upon energization and deenergization of said clutch winding, and spring means carried by one of said shafts and disposed about both of said shafts, said spring means urged by said clutch armature to frictionally embrace the other of said shafts for driving engagement with said one shaft upon energization of said clutch winding.*

*36. An electrically operated valve actuator according to claim 35, wherein said clutch armature includes a central bore which receive said actuator output shaft therethrough and a surface disposed at an angle to the axis of said actuator output shaft to engage and urge said spring means axially and radially inwardly against said actuator output shaft.*

*37. An electrically operated valve actuator according to claim 35, wherein said clutch winding includes a central bore receiving said actuator output shaft therethrough, and said surface of said clutch armature is disposed between said clutch winding and said spring means.*

*38. An electrically operated valve actuator according to claim 37, wherein said clutch armature includes a bearing carried on and slidable axially along said actuator output shaft, a first armature portion mounted at one end of said bearing and a second armature portion mounted at the other end of said bearing and carrying said surface for engagement with said spring means.*

*39. An electrically operated valve actuator, comprising:*

*an actuator housing including first and second end walls, sidewalls and a compartment wall dividing said housing into a motor compartment and a clutch compartment;*

*electric motor means mounted in said motor compartment for connection to an electrical supply to drive a valve, said motor means including an electric motor, a motor output shaft, switch means including contacts interposed between said motor and the electrical supply, and switch actuating means including cam means for engaging said switch means and a cam shaft connected to and rotatable with said motor output shaft, said switch means operated upon a predetermined number of revolutions of said motor output shaft to disconnect said motor from the electrical supply;*

*brake means mechanically connected to said electric motor and electrically connected to said switch means and responsive to the operation of said switch means to hold the valve in the condition driven by said electric motor;*

*an actuator output shaft extending through said clutch compartment for connection to a valve to be actuated;*

*energy storage means mounted in said clutch compartment and connected between said actuator housing and said actuator output shaft, said energy storage means operated to store energy upon operation of the valve in one direction of the valve in one direction; and*

*electric clutch means mounted in said clutch compartment for connecting said motor output shaft to said actuator output shaft, said electric clutch means electrically connected to the electrical supply and operable to disengage said motor output shaft and said actuator output shaft in response to loss of power from the electrical supply whereupon said energy storage means drives the valve in the opposite direction.*

*40. An electrically operated valve actuator according to claim 39, wherein said actuator output shaft and said motor output shaft are mounted for rotation and have the same axis of rotation, and wherein said electric clutch means includes a clutch winding for connection to the electrical supply, a clutch armature mounted for movement along the axis of rotation of said shafts, and spring means carried about said motor output shaft and said actuator output shaft for causing engagement and disengagement between said shafts in response to movement of said clutch armature.*

*41. An electrically operated valve actuator according to claim 40, wherein said clutch armature includes a bore for receiving said actuator output shaft therethrough, and having at least one surface disposed at an angle to the axis*

*of said shafts to engage and urge said spring means axially and radially inwardly with respect to said shafts.*

*42. An electrically operated valve actuator according to claim 40, wherein said clutch winding is fixed to one of said walls within said clutch compartment and includes a bore for receiving said actuator output shaft therethrough, and wherein at least a portion of said clutch armature is disposed between said clutch winding and said spring means.*

*43. In an electric valve actuator of the type wherein electric motor means is connectible to an electrical supply and mechanically connectible to a valve by way of the motor output shaft, the improvement therein of fail-safe means comprising:*

*spring motor means interposed between the electric motor means and the valve and operated to store energy upon driving of the valve by the electric motor means; and*

*electric clutch means connectible with the electric motor means to the electrical supply and energizable with the electric motor means to engage the electric motor means and said spring motor means and deenergizable upon a loss of power to disengage the electric motor means and said spring motor means, whereupon said spring motor means is operable to drive the valve in the direction opposite to that driven by the electric motor means,*

*said spring motor means comprising a rotatably mounted actuator output shaft for connection to the valve, and a spring having a fixed end and another end connected to said rotatable actuator output shaft,*

*and said electric clutch means comprising an electromagnetic coil, a clutch armature attracted upon energization of said coil and mounted on said actuator output shaft for relative rotary and axial movement with respect to said actuator output shaft, and a clutch spring disposed about the output shaft of the electric motor means and said actuator output shaft and urged by said clutch armature to engage the two shafts from mutual rotation in response to energization of said electromagnetic coil.*

*44. An electric fail-safe actuator for connection to a valve, comprising:*

*an electric motor for driving the valve in one direction;*

*a spring motor, wound by said electric motor, for driving the valve in the opposite direction,*

*an electric clutch energized with said electric motor for engaging said electric and spring motors and deenergized with said electric motor for disengaging said electric and spring motors and permitting said spring motor to drive the valve;*

*a housing including an intermediate wall dividing said housing into two compartments, said electric motor mounted in one of said compartments, and said spring motor and said electric clutch mounted in the other compartment,*

*said electric motor comprising a rotatably mounted output shaft,*

*said spring motor comprising a rotatably mounted output shaft for connection to the valve, and a spring mounted about said spring motor output shaft, said spring having a first end fixed to said housing and a second end connected to said output shaft,*

*said electric clutch comprising an electromagnetic coil, and means responsive to the energization of said coil to engage said two output shafts,*

*said electric motor output shaft and said spring motor output shaft being axially aligned, and*

*said means responsive to the energization of said coil comprising an armature carried about said spring motor output shaft for axial movement therealong, and a clutch spring carried by said electric motor output shaft and disposed about both of said motor shafts, said clutch spring being urged by said armature to couple said shafts for mutual rotation upon energization of said coil.*

*45. An electric fail-safe valve actuator according to claim 44, wherein said electric motor output shaft comprises an axial bore extending through said shaft; said spring motor output shaft comprises an axial bore extending at least partially into said shaft, and said actuator further comprises a cam shaft fixed in said bore of said spring motor output shaft and rotatably received through said electric motor output shaft, said cam shaft extending from said other compartment into said one compartment; at least one cam mounted on said cam shaft; and a limit switch disposed in said one compartment for operation by said cam when said valve is at a predetermined setting, said limit switch electrically connected between said electric motor and the electrical supply.*

*46. An electric fail-safe valve actuator for connection to a valve, comprising:*

*an electric motor for driving the valve in one direction;*

*a spring motor, wound by said electric motor, for driving the valve in the opposite direction;*

*an electric clutch energized by said electric motor for engaging said electric and spring motors and deenergized with said electric motor for disengaging said electric and spring motors and permitting said spring motor to drive the valve; and*

*a brake mounted on said electric motor including a brake solenoid electrically connected to said motor for simultaneous energization therewith, said brake operated to a non-braking condition upon energization, a brake drum mounted on said electric motor shaft, a brake band disposed about said brake drum and biased to a braking condition, and a mechanical linkage connected between said solenoid and said brake band.*

*47. An electric fail-safe valve actuator according to claim 46, wherein said solenoid is mounted on the side of said electric motor and includes an extensible member connected to said linkage.*

*48. An electric fail-safe valve actuator according to claim 47, wherein said mechanical linkage comprises:*

*a first plate fixed to one end of said electric motor adjacent said brake drum;*

*a second plate pivotally carried on said first plate, said second plate including means connected to the ends of said brake band;*

*a third plate pivotally carried on said first plate and pivotally connected to said extensible member and pivotal to pivot said second plate; and*

*a bias spring connected between said first and second plates to bias said second plate to tighten said band about said drum.*

*49. An electric fail-safe valve actuator according to claim 48, wherein said first plate includes an arm extending at a right angle to the plate generally parallel to the side of said electric motor and pivotally mounting said third plate.*

*50. An electric fail-safe valve actuator according to claim 49, wherein said first plate includes a second arm extending therefrom and mounting one end of said bias spring.*

* * * * *